A. G. MOORE.
LANTERN HOLDER.
APPLICATION FILED APR. 29, 1910.

980,816.

Patented Jan. 3, 1911.
2 SHEETS—SHEET 1.

Inventor
Anson G. Moore,
By Victor J. Evans
Attorney

Witnesses
Thos. F. Knox,
John A. Donegay,

A. G. MOORE.
LANTERN HOLDER.
APPLICATION FILED APR. 29, 1910.
980,816.
Patented Jan. 3, 1911.
2 SHEETS—SHEET 2.
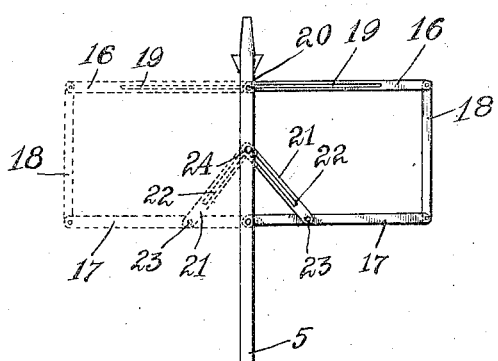
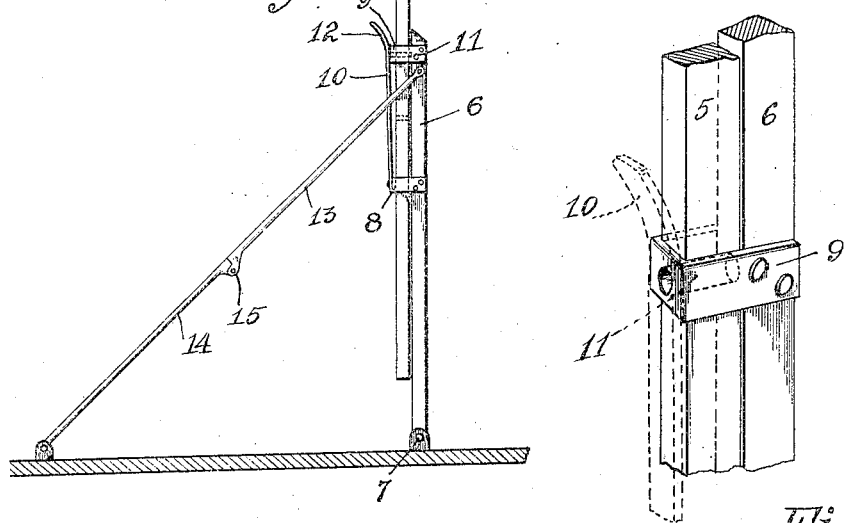
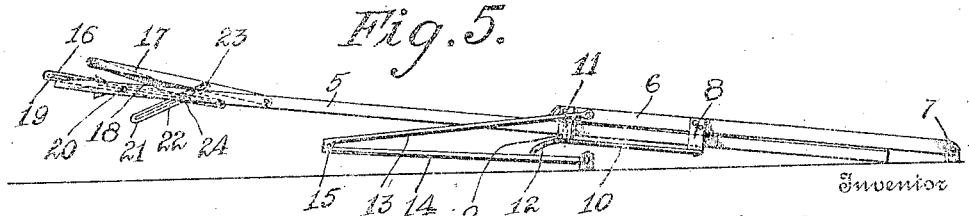

UNITED STATES PATENT OFFICE.

ANSON G. MOORE, OF GLEN, NEW YORK.

LANTERN-HOLDER.

980,816.

Specification of Letters Patent.

Patented Jan. 3, 1911.

Application filed April 29, 1910. Serial No. 558,323.

*To all whom it may concern:*

Be it known that I, ANSON G. MOORE, a citizen of the United States, residing at Glen, in the county of Montgomery and State of New York, have invented new and useful Improvements in Lantern-Holders, of which the following is a specification.

This invention relates to improvements in lantern holders for vehicles.

One object of the invention is the provision of a holder which may be folded into a comparatively small compass on the floor or bottom of the vehicle when not in use.

Another object is the provision of a holder which may be adjusted so that the light will be reflected to one side of the draft animal, or where a team of animals are employed the light may be thrown between the animals.

With these and other objects in view, which will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size, and minor details of the device may be made, within the scope of the appended claims, without departing from the spirit or sacrificing any of the advantages of the invention.

Figure 1:
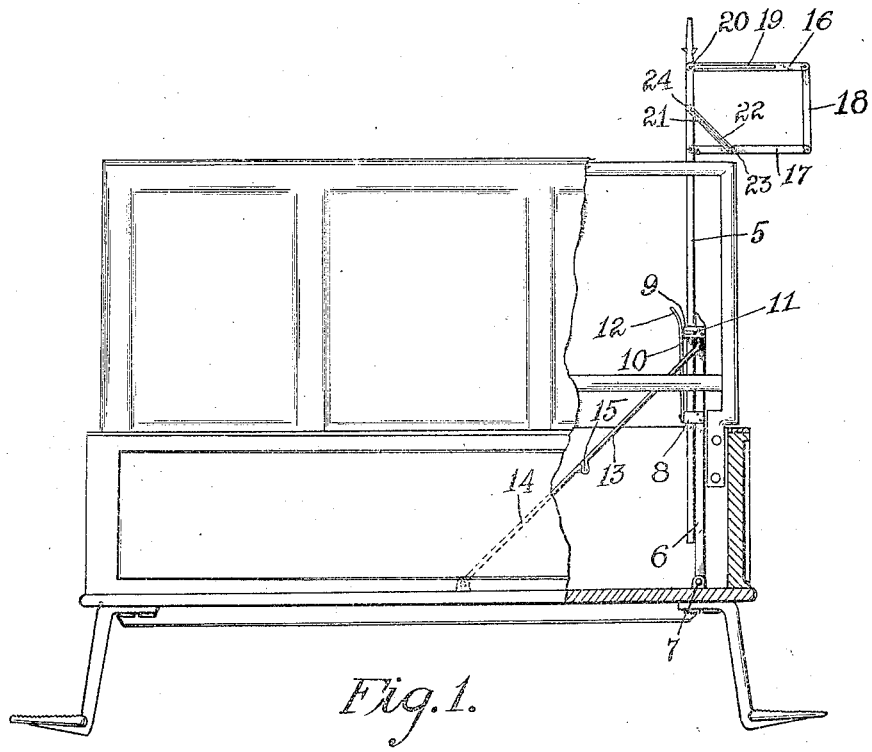
Figure 2:
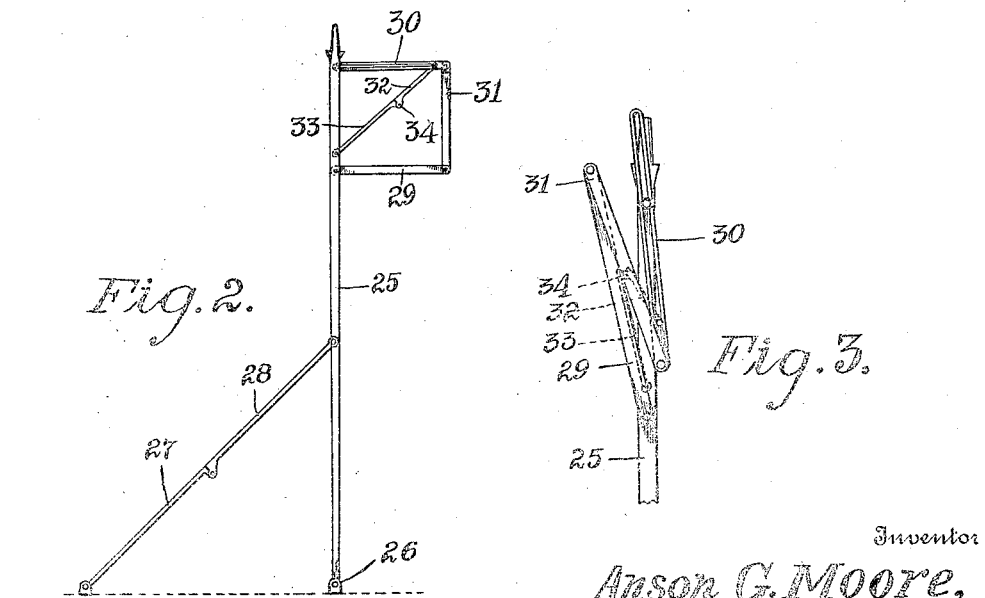
Figure 3:
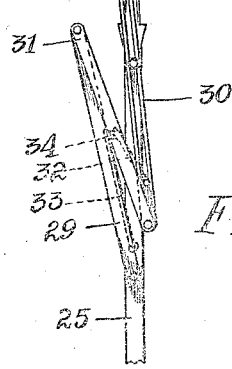

In the accompanying drawings, forming a part of the specification;—Figure 1 is a front elevation of the device showing it applied to the body of a vehicle. Fig. 2 is a similar view of a modified form of the device. Fig. 3 is a detail of the lamp holding frame of the modification shown in Fig. 2, in folded position. Fig. 4 is a view similar to Fig. 1 and showing the lamp holding frame on the opposite side of the standard when it is desired to throw the light between a pair of animals. Fig. 5 is a front elevation showing the position of the parts when not in use and folded on the floor or bottom of the vehicle. Fig. 6 is a detail perspective of a portion of the extensible standard as shown in Figs. 1, 4 and 5.

Similar numerals of reference are employed to designate corresponding parts throughout.

The device is intended to be applied for most purposes adjacent to the dashboard of the vehicle and arranged adjacent to one end thereof.

As shown in Figs. 1, 4 and 5 an extensible support or standard is employed comprising a pair of sections designated by the numerals 5 and 6. The lower of these sections has its lower end pivoted, as shown at 7, to the floor or bottom of the body of the vehicle and is provided adjacent to its middle and upper end with guide loops 8 and 9 which overlie the inner side of the section 6, when the latter extends vertically upward. The section 5 is of a size to slidingly fit in the guide loops 8 and 9 and is provided with a plurality of spaced transverse openings, as shown in Figs. 1, 4, 5 and 6. A resilient keeper, preferably formed of a single piece of spring steel or its equivalent is designated by the numeral 10 and has one end fixedly secured to the lower guide loop 8, while adjacent to its opposite end is provided with a lateral finger 11, of a size to pass through an opening in the guide loop 9 and also in any of the openings in the upper section 5. The upper or free terminal of the keeper 10 is curved laterally as shown at 12, whereby a finger hold is provided when it is desired to move the keeper laterally and disengage the finger 11 from the openings in the loop and section 5. With this construction it will be manifest that the support is extensible and its upper end may be secured at any desired height above the upper side of the dashboard.

In order that the support may be held in a vertical position a strut is employed. This member consists of two sections designated by the numerals 13 and 14, the said sections having their inner ends pivoted together as shown at 15, while their opposite ends are pivoted to the floor of the vehicle and upper end portion of the lower section 6 of the support. The connection between the strut sections 13 and 14 is of a rule-joint structure so that the outward movement of said sections will be limited beyond a certain point. As shown in Figs. 1, 4 and 5 the strut sections are so positioned that when it is desired to fold the device on the floor of the vehicle said sections are moved upwardly at their point of connection, whereby the support is free to move on its pivot and the entire device may be folded, as shown in Fig. 5.

The device for engaging with the spring clip usually employed on the rear face of the reflector of a carriage lantern, not herein shown, comprises a frame including upper and lower side members 16 and 17, the outer ends of which are connected by an end member having its opposite ends pivoted to the said outer ends of the side members 16 and 17. The inner end of the lower side member 17 is pivoted to the upper end portion of the upper section 5 of the support, while the upper side member 16 is provided for the major portion of its length with a slot 19 to receive a stud 20 extending laterally from the upper end portion of the upper section 5 of the support and at a point above the pivotal connection between the lower side member 17 and section 5. With this construction it will be manifest that the frame may be moved at right angles to either side of the section, as shown in Figs. 1 and 4, this adjustment permitting the light from the lantern to be thrown to one side of a single animal or between a pair of animals. The frame is held in its adjusted positions by means of a brace 21. This member is preferably formed of a single piece of metal and is provided for the major portion of its length with an elongated slot 22, which receives a pair of studs 23 and 24, one of which is located adjacent to the inner end of the lower side section 17, and the other on the section 5 of the support at a point between the pivotal connections between the side members and said section 5. The support is of such length that when the frame is at right angles to the section 5, the opposite ends of the slot 22 will engage with the studs 23 and 24, whereby further downward movement of the frame will be prevented.

In the modified form illustrated in Figs. 2 and 3 a single standard 25 is employed having its lower end pivoted, as shown at 26, to the floor of the vehicle and is held in vertical position by means of a brace comprising a pair of sections 27 and 28 similar to the sections 14 and 15. The upper end portion of the standard 25 is provided with a frame comprising side sections 29 and 30 similar to the side members 16 and 17 and an end member 31 pivotally connected to the outer ends of these side sections, similar to the end member 18. The frame is held at right angles to the standard by means of a brace including a pair of sections 32 and 33, the inner ends of which are connected by a rule-joint, as shown at 34, while their opposite ends are pivoted to the upper end portion of the standard and upper side section 30. With this construction it will be manifest that the sections may be folded substantially parallel with the standard as shown in Fig. 3, when the device is not in use.

From the foregoing, it is evident that I have provided a device which is comparatively simple in structure and inexpensive in manufacture, embodying few parts and these so arranged that the danger of derangement will be reduced to a minimum.

I claim:—

1. A lantern holder for vehicles comprising a standard, a foldable frame pivoted to one end portion of the standard, and a jointed strut having one end pivoted to the floor of the vehicle and its opposite end to the standard, for the purpose described.

2. A lantern holder for vehicles comprising an extensible standard, a foldable frame pivoted to one end portion of the standard, and a strut having its opposite end portions pivoted to the floor of the vehicle and the standard.

3. A lantern holder for vehicles comprising a standard, a frame including spaced side portions, one of which has one end portion slidingly fitted on the standard and the other having one end portion pivoted to the standard, an end piece having its opposite end portions pivoted to the other end portions of the sides, and a member having its opposite ends pivoted to the standard and one of said side members, for the purposes described.

In testimony whereof I affix my signature in presence of two witnesses.

ANSON G. MOORE.

Witnesses:
J. S. GLEN EDWARDS,
ANDREW A. TURNBOUL.